United States Patent [19]

Lenhart

[11] Patent Number: 5,122,016

[45] Date of Patent: Jun. 16, 1992

[54] HIGH SPEED VERTICAL SINGLE FILER

[76] Inventor: Ronald A. Lenhart, 2520 Van Gordon, Lakewood, Colo. 80215

[21] Appl. No.: 642,636

[22] Filed: Jan. 17, 1991

[51] Int. Cl.⁵ .............................................. B65G 51/03
[52] U.S. Cl. ........................................ 406/86; 406/88
[58] Field of Search ............................... 406/86, 87, 88

[56] References Cited

U.S. PATENT DOCUMENTS

| | | | |
|---|---|---|---|
| 4,123,113 | 10/1978 | Koss | 406/88 |
| 4,451,182 | 5/1984 | Lenhart | 406/86 |
| 4,462,720 | 7/1984 | Lenhart . | |
| 4,500,229 | 2/1985 | Cole | 406/88 |
| 4,561,806 | 12/1985 | Lenhart . | |
| 4,721,419 | 1/1988 | Lenhart | 406/88 |
| 4,730,955 | 3/1988 | Lenhart | 406/86 X |
| 4,730,956 | 3/1988 | Lenhart . | |
| 4,900,034 | 2/1991 | Kapke et al. | 406/86 X |
| 5,009,550 | 4/1991 | Hilbish | 406/88 X |

FOREIGN PATENT DOCUMENTS 2061856  11/1981  United Kingdom .................. 406/88

Primary Examiner—Margaret A. Focarino
Assistant Examiner—James M. Kannofsky
Attorney, Agent, or Firm—Fields, Lewis, Pittenger & Rost

[57] ABSTRACT

In accordance with this invention, a method of transporting upright cylindrical articles is provided wherein the articles are fed from a mass at an upstream location into single file at a downstream location. The articles are fed in mass into the infeed of the deck of an air table. A lower air pressure zone is created on a first lateral portion of the deck plate between the upstream and downstream locations. A higher air pressure zone is created on a second lateral portion of the deck plate to cause the articles to move into single file in the first lateral portion. Velocity air pressure is used to move the single filed articles to a downstream location. The articles are held in single file with a directional mass volume of air. The pressure differential between the high and low pressure zones can be adjusted to vary the density of the articles at the infeed. A higher air pressure zone can be created in a downstream single file area to cause articles which are not in single file to move upstream to be placed in single file.

14 Claims, 5 Drawing Sheets

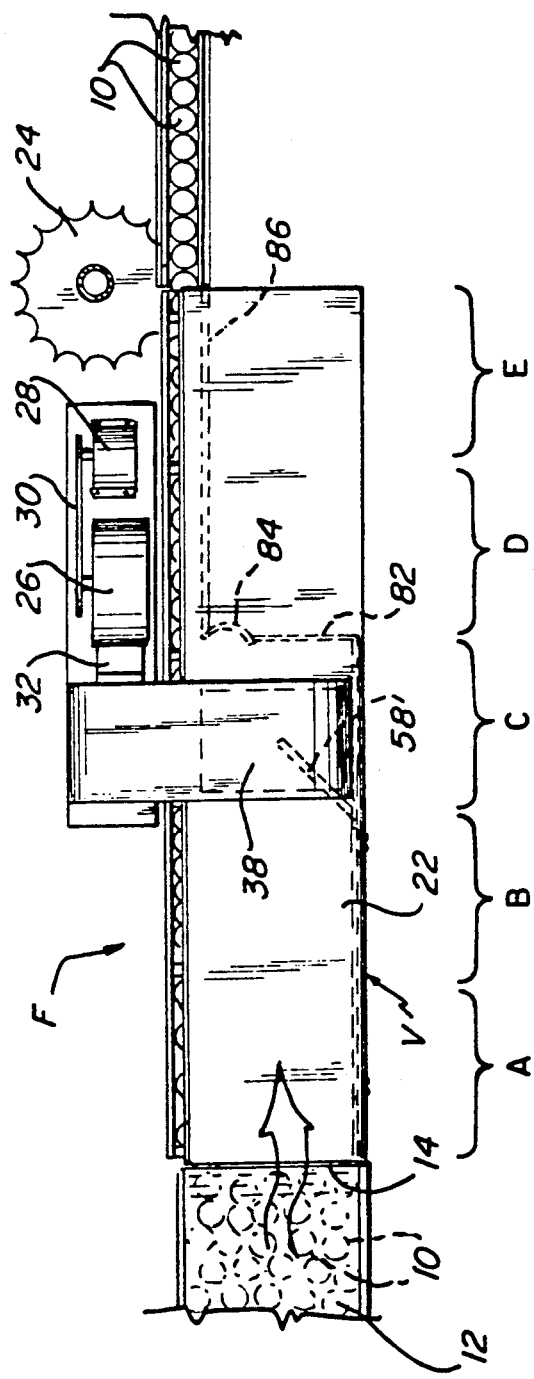
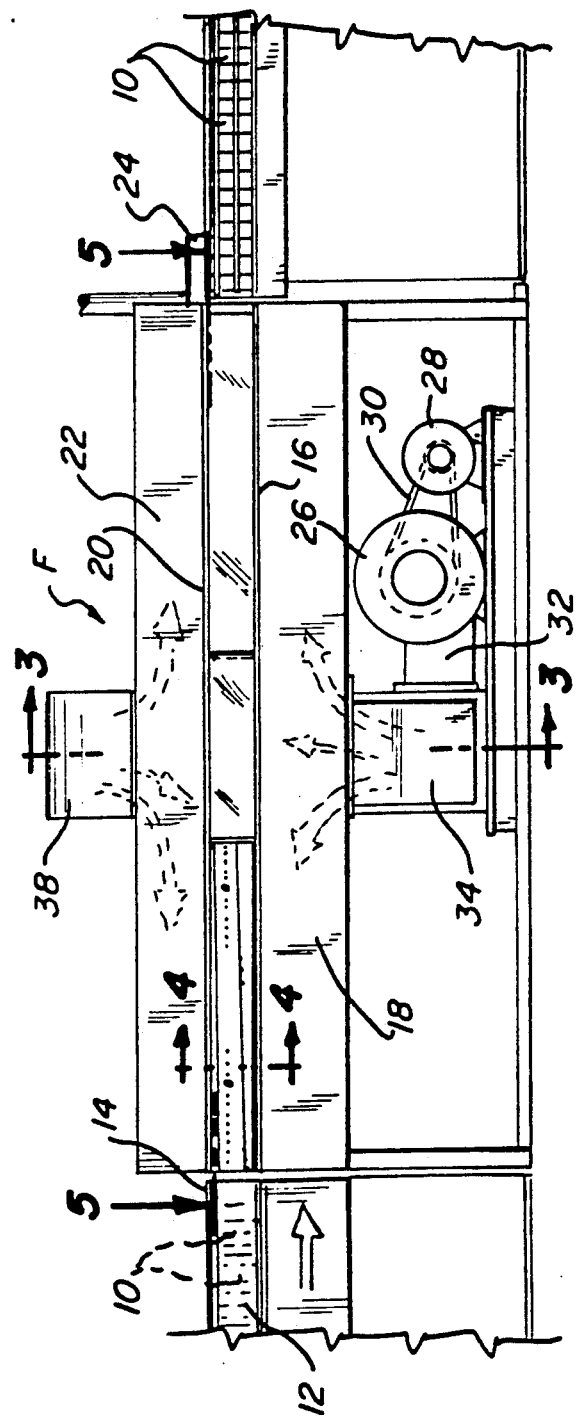

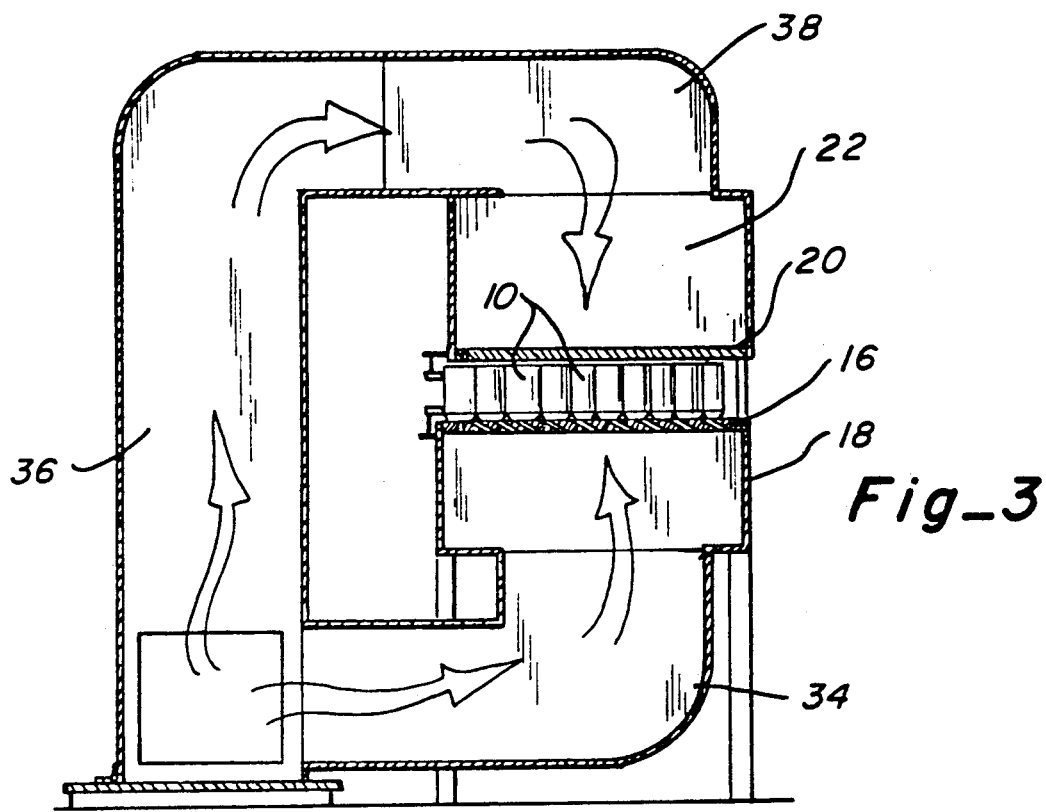
Fig_3
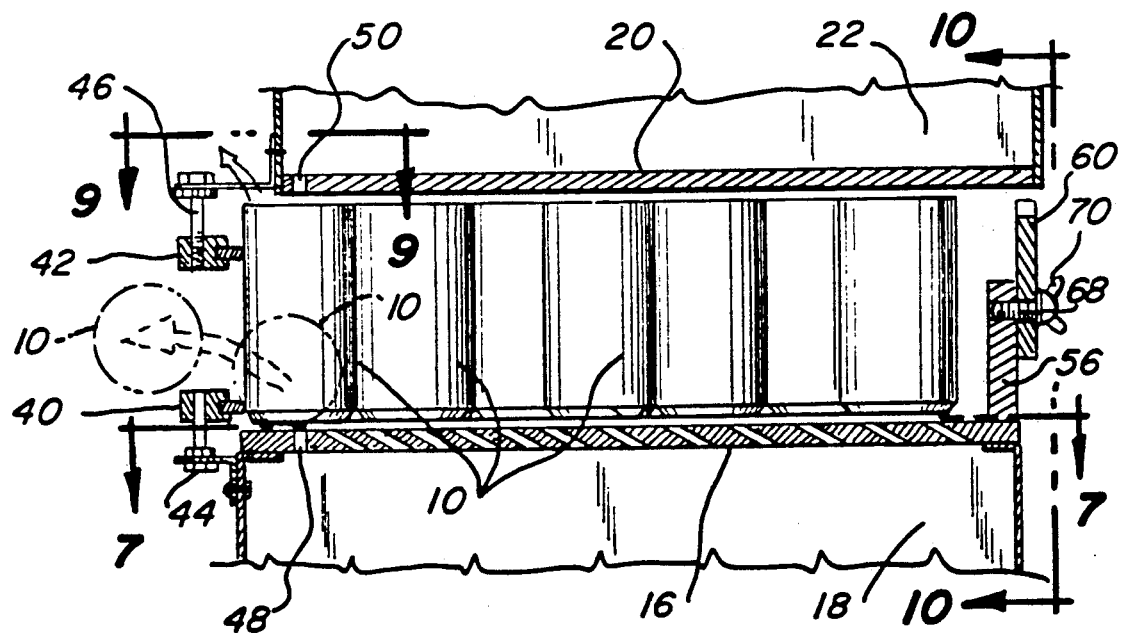
Fig_4

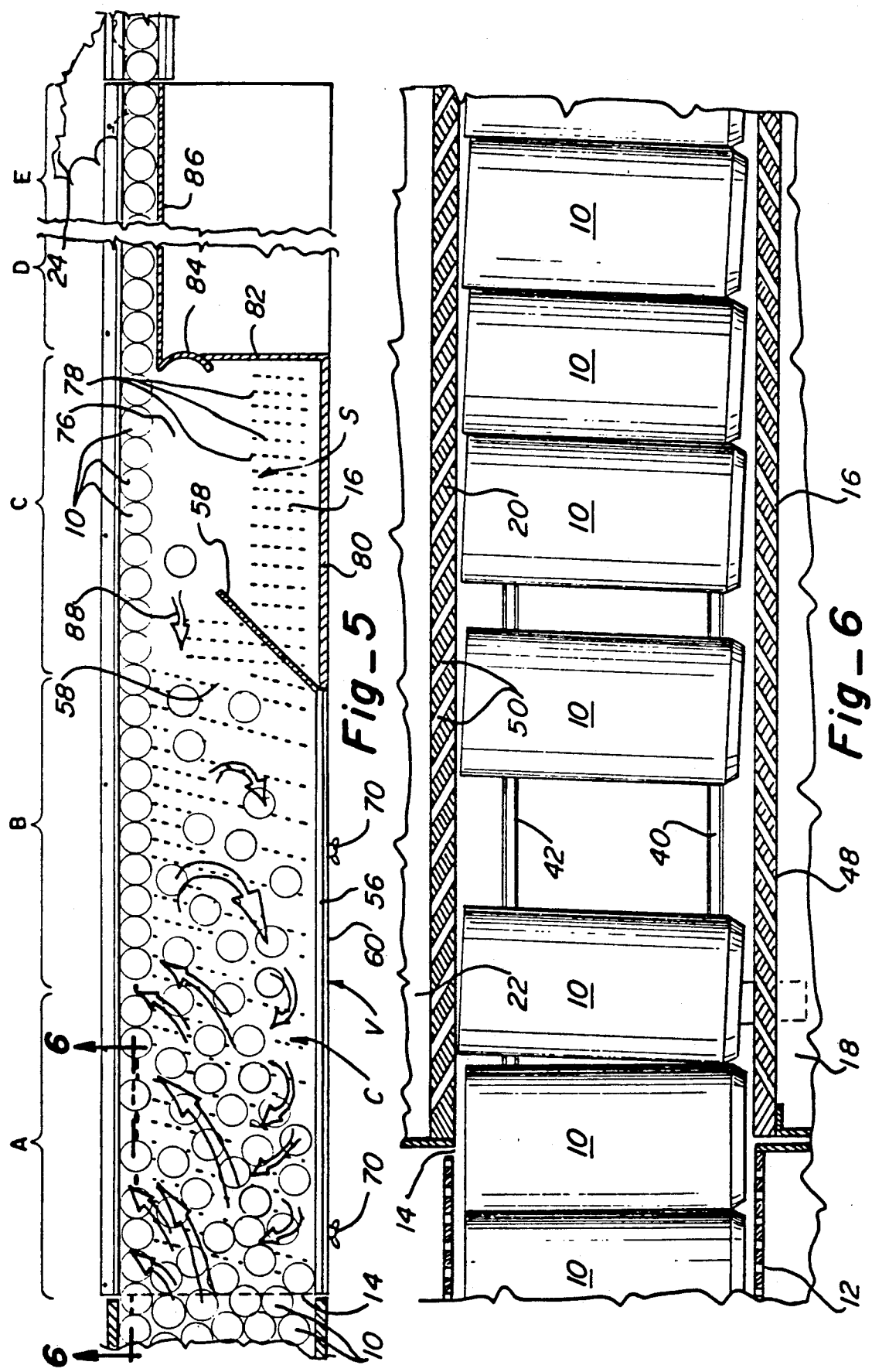

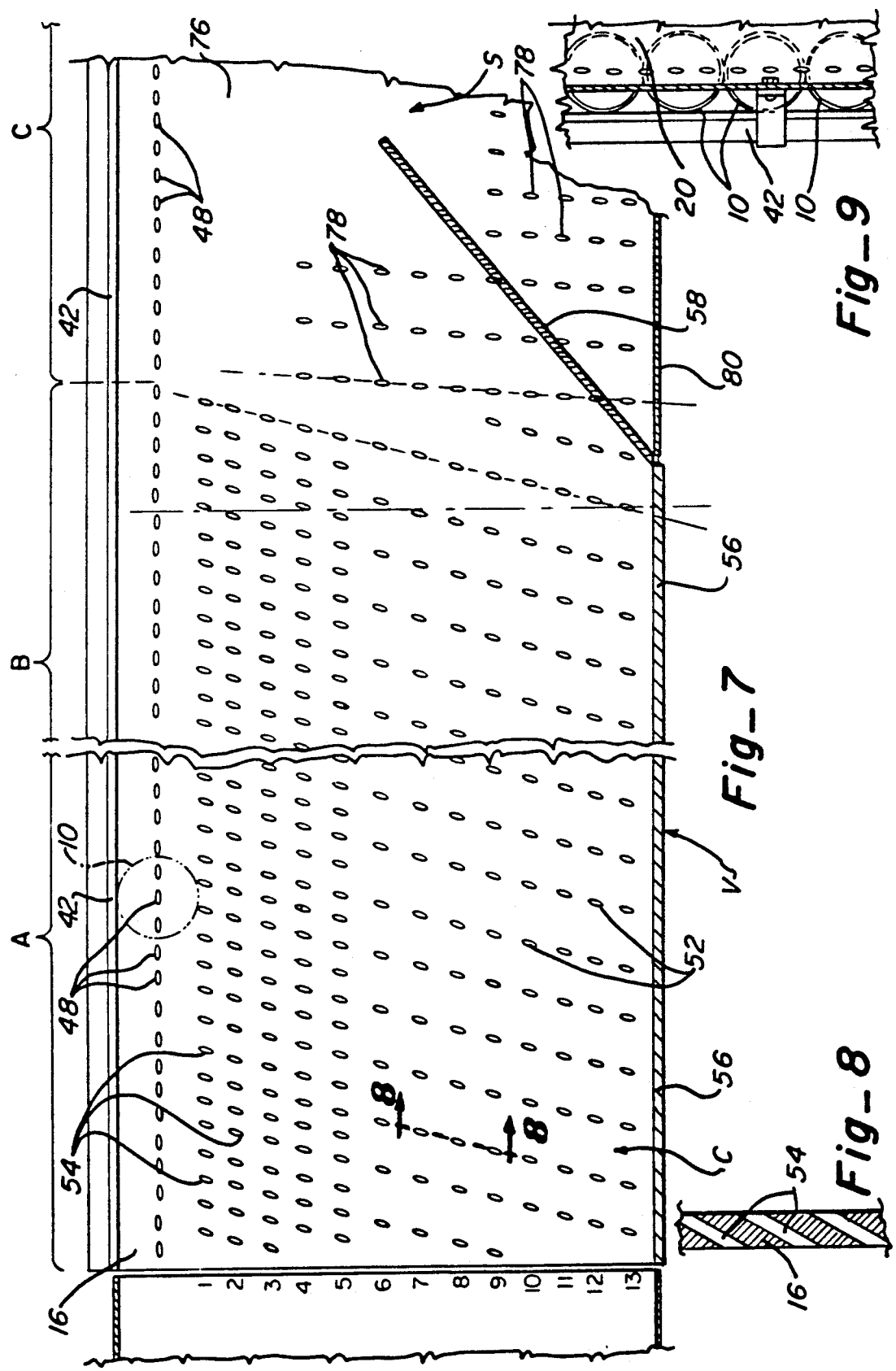

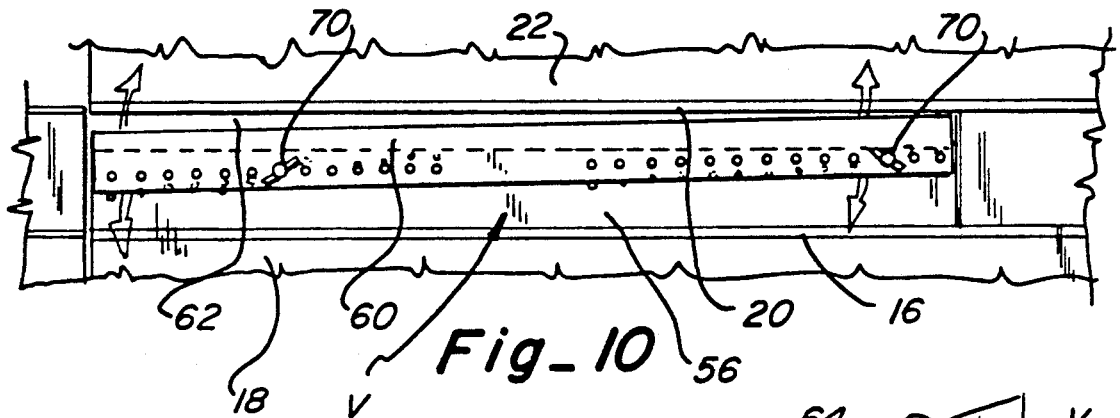
Fig_10
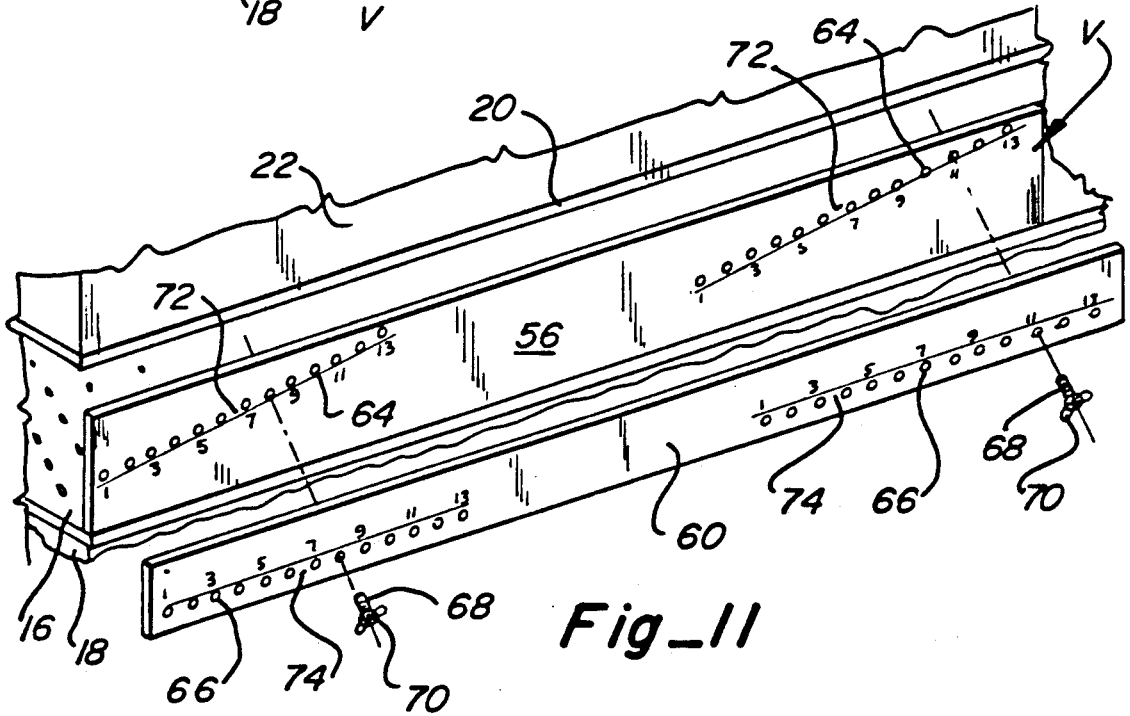
Fig_11

HIGH SPEED VERTICAL SINGLE FILER

This invention relates to a device for moving a mass of empty cylindrical articles, such as beverage containers into single file and more particularly for moving the containers into single file at high speed while minimizing damage to the articles and jamming.

BACKGROUND ART

There are many occasions within a can manufacturing plant in which a mass of containers needs to be fed into a single line for supplying the containers to decorators, base coaters and other apparatus in the plant which must perform an operation on or with respect to the container. With the development of higher speed apparatus for performing all of these functions, it becomes necessary to develop apparatus for providing the containers to the equipment at greater speeds. Single filing used to be done by a variety of mechanical single filers. With the development of air conveyors, single filing devices have been developed which support the containers on a layer of air and use air as a propelling force for manipulating and moving the containers. This has provided significantly higher single filing capabilities.

One such single filing apparatus is disclosed in my U.S. Pat. No. 4,462,720 for cAir Table System". This device supports containers on a table by a layer of air provided by air jets slanted in the downstream direction toward a single file conveying zone. An imperforate cover is placed above the surface of the table a distance slightly greater than the longitudinal dimension of the containers being transported and is positioned over at least a portion of the single file conveying zone. Blowback jets are connected to a source of air under pressure for supplying air in the single file conveying zone in opposition to the direction of normal flow of the objects. By use of this apparatus, a mass of containers can be rearranged into single file arrangement for discharge at the downstream end of the table.

Another single filer is shown in my U.S. Pat. No. 4,561,806 for "Vertical Single Filer Conveyor System". In this apparatus, containers are fed from a mass of containers onto a table which has at least three zones extending from an upstream location. The containers are supported and moved by a prearranged pattern of flotation air jets. In addition, a row of acceleration jets, which are larger in size than the flotation jets, are located in the table adjacent to and spaced in parallel relation to converging sides of the table to form two converging rows of acceleration jets. Means is provided to incrementally increase the volume and velocity of air through the acceleration jets between each of the three zones from the upstream location to the downstream location to accelerate and longitudinally separate the objects as they move along the table from the upstream location to the downstream location so that the converging of the sides coacts with the acceleration jets to converge longitudinally separated containers in a prearranged pattern to bring them into single file. This device has been found to be very satisfactory for placing smooth decorated containers in single file at relatively high speed.

Neither of these devices will work with highly etched containers. During the manufacturing process, the containers are run through an acid wash which etches the outer surface of the containers so that the decorative coating will adhere to the surface of the containers. Furthermore, because of environmental concerns, the acid cannot freely be dumped, and therefore it is impossible to control the amount of etching on the containers as was previously possible. In other words, the acid solution must be strong enough to provide the minimum etching required but if there is a stall in the line and the containers stay in the etching solution too long the acid cannot be dumped but rather the container just becomes more highly etched. This creates greater problems in manipulating the containers because the adjacent contacting edges of the etched containers act like little gear teeth and interlock with each other so that the containers want to rotate with each other rather than moving individually and sliding past each other.

Still another single filer is shown in my U.S. Pat. No. 4,730,956 for "Shock Absorbant Single Filer". In this apparatus, multiple rows of containers are brought into an alignment zone, arranged in nested relationship, merged into a equilateral triangle configuration with mutually touching side edges in a nesting section within the alignment zone and accelerated into a high pressure buffer section of the alignment zone where they are separated from each other and converged into single file. In one embodiment, the imperforate side walls in the buffer section slope downwardly away from an imperforate top cover to provide gradual relief of air pressure within the buffer section. In another embodiment, the imperforate side walls have an upper edge which is contiguous with a top cover in the form of a plenum having rows of jet openings positioned above the jet openings in the air table. The imperforate side walls extend downstream to a point where the air buffer zone is less than two container diameters in width. The containers provide a self-valving action wherein the most downstream container moves away from the imperforate side wall on one side wall on one side and relieves the air pressure so that the next upstream container moves downstream. While this device is suitable for its intended purpose, it is of complex construction and requires adjustable dampers in both the upper and lower plenums for controlling and adjusting the air pressure on the containers.

DISCLOSURE OF THE INVENTION

In accordance with this invention, a method of transporting upright cylindrical articles is provided wherein each article has an exterior surface with a high coefficient of friction with respect to adjacent articles. The articles are fed from a mass at an upstream location into single file at a downstream location. The method includes the steps of conveying the articles in mass into the infeed of the deck of an air table. A lower air pressure zone is created on a first lateral portion of the deck plate between the upstream and downstream locations which draws the articles from the infeed into the first lateral portion. A higher air pressure zone is created on a second lateral portion of the deck plate to assist in moving the articles into single file in the first lateral portion. Velocity air pressure is used to move the single filed articles to a downstream location. The method may further include holding the articles in single file with a directional mass volume of air and adjusting the pressure differential between the high and low pressure zones to vary the density of the articles at the infeed. A higher air pressure zone is created in a downstream single file area to cause articles which are not in single file to move upstream into the lower air pressure zone to be placed in single file.

Apparatus for accomplishing this method includes an air table extending from the infeed at an upstream location to a downstream location and having an upper surface, opposite side edges and an underside. Vertically spaced parallel side rails are provided above one of the side edges. A substantially imperforate cover is provided above the table a distance slightly greater than the height of the articles, the cover having a bottom surface, side edges and a top side. A longitudinal bottom row of openings communicates the upper surface and the underside of the table and are positioned adjacent to and parallel to the first side edge. The longitudinal bottom row of openings extends from the upstream location to the downstream location and are configured to support and move the containers in single file along the rail through the circulating zone and the single file zone to the downstream location. A first set of diagonal rows of openings communicate the surface and the underside of the table in an upstream circulating zone and extend laterally across the circulating zone and are angled in the downstream direction. The first set has a greater density of openings under the portion of the circulating zone closest to the first side edge to provide a greater volume of air moving at a high velocity toward the side rails than the movement of air above the portion of the circulating zone furtherest from the first side edge to create a decreasing air pressure gradient in the direction of the side rails to cause the articles to move toward the side rails and into single file. The lower air pressure draws the articles from the infeed into the circulating zone. A second set of diagonal rows of openings communicates with the surface and the underside of the table in a downstream single file zone and extends laterally across the single file zone and are angled in a downstream direction but spaced from the side rails a distance greater than two article diameters. This creates a high pressure area in the single file zone. Any article in the single file zone which is not in single file will tend to be drawn from the single file zone high pressure area into the low pressure area of the circulating zone to be placed into single file.

A longitudinal top row of openings communicate with the bottom surface and the top side of the cover above the longitudinal bottom rows of openings and are configured to supply air in the downstream direction at a velocity pressure sufficient to keep the articles in contiguous single file relationship and move them toward the downstream location. A lower plenum is attached to the underside of the table and an upper plenum is attached to the cover, both being connected to a common source of air pressure. An imperforate side wall along the other edge of the table extends the full length of the circulating zone and the single file zone and has a height at least equal to the distance between the table and the cover. A laterally extending imperforate barrier is positioned between the circulating zone and the single file zone, the barrier having a height at least equal to the distance between the table and the cover with the first end against the imperforate side wall and the second end spaced from the side rails a distance greater than two article diameters.

The side edge of the cover is offset inwardly from the first side edge of the air table to facilitate discharge of air from the single filer. In addition, the lowermost side rail is spaced above the upper deck surface to allow air to escape thereunder to hold the single filed article against the lowermost rail. The velocity pressure of the air through the longitudinal top row of openings causes the tops of each article to tilt in the downstream direction as it passes from the circulating zone into the single file zone.

An adjustable vent is provided along the circulating zone to control the pressure differential between the high and low pressure zones to vary the density of articles at the infeed and the rate of speed at which they are arranged in single file. The vent includes a lower imperforate panel extending from the infeed to the barrier having a height substantially less than the distance between the deck and the cover and an upper imperforate panel having a length substantially the same as the lower panel and a height slightly greater than the distance between the top of the lower panel and the cover so that the upper and lower panels overlap. Means is releasably and adjustably provided for attaching the upper panel to the lower panel to vary the spacing of the upper panel from the cover.

This adjusting means may comprise a row of horizontal openings adjacent opposite ends of one of the panels and a row of diagonal openings adjacent the opposite ends of the other panels. Means can extend through the openings in one of the panels and into the openings of another panel to adjust the height of the second panel relative to the cover to adjust the air pressure within the circulating zone. This means can include a wing nut with threaded shanks wherein one of the panels has tapped openings for threadably receiving the shanks and the other of the panels has openings sized to slidably receive the shanks.

With the foregoing method and apparatus, a single filer has been provided which can be operated at high speeds and is of relatively simple construction and does not require damper controls.

Additional advantages of this invention will become apparent from the description which follows, taken in conjunction with the accompanying drawings.

BRIEF DESCRIPTION OF THE DRAWINGS

FIG. 1 is a top plan view of a high speed single filer constructed in accordance with this invention;

FIG. 2 is a side elevation of the single filer of FIG. 1;

FIG. 3 is an enlarged, vertical section, taken along line 3—3 of FIG. 2, showing the air supplied to the upper and lower plenums;

FIG. 4 is an enlarged vertical section, taken along line 4—4 of FIG. 2, showing the arrangement of the articles in the circulating zone;

FIG. 5 is a horizontal section, taken along line 5—5 of FIG. 2, showing the circulation of the containers within the circulation zone and the movement of them through the single file zone;

FIG. 6 is a greatly enlarged horizontal section, taken along line 6—6 of FIG. 5, showing the movement of the articles in single file;

FIG. 7 is an enlarged, fragmentary plan view of the circulating zone of the single filer of FIG. 5;

FIG. 8 is an enlarged horizontal section, taken along line 8—8 of FIG. 7, showing details of the openings;

FIG. 9 is a horizontal section, taken along line 9—9 of FIG. 4, showing the offset of the upper plenum with respect to the lower plenum;

FIG. 10 is a side elevation of the vent for the circulating zone; and

FIG. 11 is an exploded view of the vent of FIG. 10 showing additional details of construction.

BEST MODE FOR CARRYING OUT THE INVENTION

As best seen in FIGS. 1 and 2, a single filer F is provided which receives articles 10, such as aluminum beverage containers, in mass from an infeed conveyor 12 to infeed 14. The conveyor has a deck plate 16 with opposite side edges to which a lower plenum 18 is connected. A generally imperforate upper cover 20 is spaced above deck plate 16 a distance slightly greater than the height of articles 10 and has an upper plenum 22 connected thereto. Openings are provided in the deck plate 16 and the cover 20, as will be discussed more fully below.

The articles are discharged in single file to a star wheel 24 which meters the speed at which the articles proceed in single file. Instead of feeding to a star wheel, the articles could be fed to a decorator or other device where a specific function is to be performed on each container.

Air is supplied to the plenums by a blower 26 driven by a motor 28 through belt 30. A transfer duct 32 conducts air under pressure to a lower duct 34 connected to lower plenum 18. Similarly, a vertical duct 36 conveys air under pressure to an upper duct 38 which supplies the air to upper plenum 22. Air pressure in the plenums can be provided at 18.0 inches of static pressure, which has been found satisfactory for arranging twelve ounce aluminum containers in single file. One inch of static pressure will raise a column of water one inch at 70° F. It will be apparent to one skilled in the art that other pressures could be used for different sizes of containers having different weights, diameters and other physical characteristics.

As best seen in FIG. 5, the articles 10 are fed into the infeed 14 in mass and move to one side of the air table under the influence of the flow of a mass volume of air which creates a differential air pressure across the upstream circulating zone C, as will be explained more fully below. The containers come into engagement with a lower side rail 40 and an upper side rail 42, as best seen in FIG. 4. Conveniently, side rail 40 is spaced above deck 16 so that air can flow therebetween, this spacing being adjustable by means of adjustment screw 44. Upper rail 42 engages the side of articles 10 and is adjusted by means of adjustment screw 46. The spacing between the two rails is such that a downed article will roll, under the influence of air pressure, between the rails and be discharged.

Conveniently, deck plate 16 is provided with a row of longitudinal openings 48 which are parallel to side rails 40 and 42, as shown in FIG. 7, and spaced inwardly therefrom approximately one-half an article diameter. They are sloped downstream at an angle, such as 65° to 70° from the perpendicular so as to support the articles and provide a downstream component of force to urge the articles downstream. Similarly, cover 20 is provided with a longitudinal row of openings 50 which are positioned directly over openings 48. These openings 50 are sloped at the same angle as lower openings 48 and provide a high velocity of air pressure which keeps the containers in contiguous single file arrangement as they move from circulating zone C through single file zone S.

For convenience of discussion, the single filer has been divided into Sections A through E, best shown in FIGS. 1 and 5. With 18 inches of static pressure, a suitable amount of air in cubic feet per minute (CFM) emitted through lower openings 48 for transporting twelve ounce aluminum beverage containers which has been found to be satisfactory is 1.73 CFM in Section A; 1.78 CFM in Section B; 1.10 CFM in Section C; 1.14 CFM in Section D and 1.19 CFM in Section E. The CFM from top openings 50 is 1.50 CFM in Section A; 1.53 CFM in Section B; 2.33 CFM in Section C; 2.36 CFM in Section D and 0.95 CFM in Section E. Each of these sections is approximately 24" in length. The greater CFM through certain sections of the single filer through top openings 50 as compared to lower openings 48 creates a forward tilt to the containers 10, as best illustrated in FIG. 6. This assures that the front upper edge of the container will not become hung up on cover 20 and cause a container to tip backwards and fall down on the conveyor. The upper edges of the containers are sometimes jagged which could create this undesirable situation. Therefore, the containers must be held in upright orientation or tilted slightly forward so that if the upper edge of the container engages the cover 20, it will be the back edge of the container which will engage the surface of cover 20 and not cause the container to be upset.

An array of openings is provided across deck plate 16 as best seen in FIG. 7 which support the containers and creates a lateral flow of air which experiences a decreasing pressure gradient toward side rails 40 and 42. At the far side of the deck plate 16 are a plurality of rows of openings 52 which are on $1\frac{1}{4}$" centers in the longitudinal direction and are angled downstream at approximately 15° and are at an angle with respect to the perpendicular at 65° to 70°. On the side of the center line closest to side rails 40 and 42 are five rows of openings 54 which are spaced on $\frac{3}{4}$" centers in the longitudinal direction and also are angled at 15° downstream and at 65° to 70° from the perpendicular. Because of the greater mass flow of air flow through openings 54 compared to openings 52, the air pressure will drop across deck plate 16 in the direction of the side rails causing the containers to move in that direction in response to the mass flow of air and the change in air pressure. As openings between containers open up along side rails 40 and 42, the pressure will drop substantially, pulling any containers in the circulating zone adjacent that opening into single file along side rails 40 and 42.

For convenience, the rows of openings have been numbered from 1 to 13 along the left-hand end of FIG. 7. At 18 inches of static pressure, it has been found that the satisfactory CFM per opening for twelve ounce aluminum containers in Row 1 is 1.53 CFM per opening in Sections A and B; rows 2 and 3 1.24 CFM per opening in Sections A and B; rows 4 through 13 0.92 CFM per opening in Section A and 0.82 CFM per opening in Section B.

This air pressure gradient causes the articles to circulate in a generally clockwise direction as shown in FIG. 5 wherein the articles move into any spaces occurring between articles along the side rails. By the time the articles reach the downstream end of circulating zone C they are substantially in single file arrangement and contiguous with each other due to the velocity air pressure upon them from the air from lower openings 48 and upper openings 50.

The circulation and density of containers within circulating zone C is controlled by vent V which, as best seen FIGS. 10 and 11 comprises a lower generally imperforate lower panel 56 having a length extending from infeed 14 to an imperforate diagonal barrier 58 and extends laterally from panel 56 at an angle of approximately 45°, as shown in FIG. 5, and provides a divider between circulating zone C and single file zone S. The height of the barrier is substantially equal to the distance between deck 16 and cover 20. The opposite end of the barrier is spaced from rails 40 and 42 a distance at least slightly greater than two article diameters, for a purpose to be discussed.

Vent V also includes an imperforate upper panel 60 which is the same length as lower panel 56 and is attachable and adjustable vertically at either end so as to provide a variable sized air discharge slot 62 between the upper edge of panel 60 and cover 20. Conveniently, a diagonal row of openings 64 is provided at opposite ends of panel 56, which are tapped, and a horizontal row of openings 66 are provided at opposite ends of upper panel 60. Openings 66 are sized for slidably receiving threaded shanks 68 of wing nuts 70 which are threadably received in tapped openings 64. Indicia can be provided, such as indicia 72 on lower plate 56, adjacent openings 64 and indicia 74 on upper plate 60 adjacent openings 66, to provide a convenient means of locating the appropriate location for the threaded shanks 68 for the correct adjustment for known predetermined operating conditions.

The single file zone S is provided with an imperforate area 76 on deck plate 16 adjacent to the single file row of containers 10. A set of laterally spaced diagonal rows of openings 78 extend from an imperforate side wall 80 to a location substantially aligned with the inner end of barrier 58 and angled downstream at a 5° angle and are 65° to 70° from perpendicular. In other words, rows of openings 78 terminate from side rails 40 and 42 a distance slightly greater than two article diameters. The openings 78 which are between barrier 58 and the side rails, emit 0.82 CFM per opening and those that are on the other side of barrier 58 and downstream therefrom emit air at 2.19 CFM per opening for satisfactory operation of the single filer with twelve ounce aluminum containers at 18 inches static pressure.

The downstream end of side wall 80 terminates at imperforate end wall 82 which extends inwardly to an imperforate arcuate member 84 which in turn is connected to an imperforate side wall 86 extending to the downstream end of the single filer. This wall 86 is parallel to side rails 40 and 42 and is spaced therefrom a distance slightly greater than the diameter of the articles.

With this arrangement, the single file zone becomes a high pressure area compared with the circulating zone. This pressure differential normally prevents articles which are not in single file from moving into the single file zone S. However, any articles which may enter this zone will be pulled laterally away from the single file row of articles 10 toward the imperforate side wall 80 by the low pressure created by the air from openings 78 which are downstream of imperforate barrier 58. The volume of air emitted from openings 78 creates a high pressure area at imperforate area 76 adjacent the single file row of articles 10, which minimizes the possibility that an article which enters zone S engages the single file row of articles 10 and causes a jam. The article is held in a lateral location where the air pressure created by openings 78 and the back pressure of air trapped by the single file row of articles above imperforate area 76 is substantially equal. Thus, misaligned articles are held in equilibrium in this location. As soon as openings occur along the rails in the circulating zone of sufficient size to reduce the air pressure in that zone, any article in the single file zone which is not in single file will move upstream, as indicated by arrow 88, past the end of barrier 58 and back into circulating zone C where it can enter the clockwise flow with the other articles and eventually be moved into single file along side rails 40 and 42.

As previously discussed, for different operating conditions it may be desirable to change the size of the openings, the angle thereof and the CFM emitted from specific air jets. Also, these changes may be required with respect to articles having different diameters, weights or other characteristics. Also, the number and spacing of the openings can be modified as required.

From the foregoing, the advantages of this invention are readily apparent, a single filer has been provided which can operate at high speeds without jamming, yet is simple in construction. The opening of spaces between the single file row of articles, reduces air pressure in the circulating zone which has the dual function of drawing articles from the upstream infeed into the circulating zone and drawing misaligned articles into the single file zone upstream into the circulating zone. No dampers or other controls are required and due to the pressure gradience created by the arrangement of openings in the deck plate, the containers will be handled gently with a minimization of damage to them as they are brought into single file and fed from the infeed to the downstream end.

This invention has been described in detail with reference to a particular embodiment thereof, but it will be understood that various other modifications can be effected within the spirit and scope of this invention.

I claim:

1. A method of transporting upright cylindrical articles, wherein each article has a bottom and an open top and an exterior surface with a high coefficient of friction with respect to an adjacent article, from a mass at an upstream location into single file at a downstream location; said method comprising the steps of:
    conveying the articles in mass from an infeed into a circulating zone above the deck plate of an air table;
    creating a lower air pressure zone above a first lateral portion of the deck plate between the upstream and downstream locations;
    creating a higher air pressure zone above a second lateral portion of the deck plate to cause the articles in the circulating zone to move from the second lateral portion into single file in the first lateral portion; and
    using velocity air pressure to move the single filed articles to the downstream location, the velocity air pressure tipping the tops of the articles toward the downstream location as the articles move in single file along a portion of said deck plate.

2. A method of transporting upright cylindrical articles, wherein each article has a bottom and an open top and an exterior surface with a high coefficient of friction with respect to an adjacent article, from a mass at an upstream location into single file at a downstream location; said method comprising the steps of:
    conveying the articles in mass from an infeed into a circulating zone above the deck plate of an air table;

creating a lower air pressure zone above a first lateral portion of the deck plate between the upstream and downstream locations;

creating a higher air pressure zone above a second lateral portion of the deck plate to cause the articles in the circulating zone to move from the second lateral portion into single file in the first lateral portion;

using velocity air pressure to move the single filed articles to the downstream location; and adjusting the pressure differential between the high and lower pressure zones to vary the density of articles at the infeed.

3. A method of transporting upright cylindrical articles, wherein each article has a bottom and an open top and an exterior surface with a high coefficient of friction with respect to an adjacent article, from a mass at an upstream location into a single file at a downstream location; said method comprising the steps of:

conveying the articles in mass from an infeed into a circulating zone above the deck plate of an air table;

creating a lower air pressure zone above a first lateral portion of the deck plate between the upstream and downstream locations;

creating a higher air pressure zone above a second lateral portion of the deck plate to cause the articles in the circulating zone to move from the second lateral portion into single file in the first lateral portion;

using velocity air pressure to move the single filed articles to the downstream location; and creating a longitudinal separation between single file articles in the circulating zone to reduce air pressure in the lower air pressure zone sufficiently to draw a mass of articles into the circulating zone from the infeed and to draw any misaligned articles in the single file zone upstream into the circulating zone.

4. A method of manipulating misaligned upright cylindrical articles in a single file zone of an air single filer including the steps of:

creating a high pressure area adjacent the single file row of articles which holds the misaligned articles away from the single file row of articles;

creating a low pressure area in the single file zone on the side of the high pressure area opposite the single file row tending to move misaligned articles laterally away from the single file row; and subjecting the misaligned articles to a mass volume of air flowing laterally toward the single file row of articles in the single file zone tending to move said misaligned articles toward the single file row of articles, so that the misaligned articles are held in equilibrium at a location spaced from the single file row by the opposing forces created on the misaligned articles by the back pressure created by the single file row and the mass volume of air.

5. A method, as claimed in claim 4, including the further step of:

creating a lower pressure area upstream from the single file zone in the circulating zone to cause the misaligned articles to move upstream from the location of equilibrium in the single file zone to the lower pressure area of the circulating zone.

6. A single filer for the transport of a mass of upright cylindrical articles from an upstream location to a single file arrangement at a downstream location and providing, in series, an article circulating zone and a single file zone between said upstream location and said downstream location, said single filer comprising:

an air table extending from an infeed at said upstream location to said downstream location, having an upper surface opposite side edges and an underside;

at least one side rail located above one of said side edges;

an imperforate cover above said table a distance slightly greater than the height of the articles; said cover having a bottom surface, side edges and a top side;

a longitudinal bottom row of openings communicating said upper surface and said underside of said table adjacent to and parallel to said first side edge, said longitudinal bottom row of openings extending from said upstream location to said downstream location which are configured to support and move the containers in single file along said rail through said circulating zone and said single file zone to said downstream location;

a first set of diagonal rows of openings communicating said surface and said underside of said table extending laterally across said circulating zone and angled in said downstream direction, said first set having a greater density of openings under the portion of said circulating zone closest to said first side edge to provide a greater volume of air moving at high velocity toward said side rails than the movement of air above the portion of said circulating zone furtherest from said first side edge to create a decreasing air pressure gradient in the direction of said side rails to cause said articles to move toward said side rails and into single file;

a second set of diagonal rows of openings communicating said surface and said underside of said table extending laterally across said single file zone and angled in a downstream direction but spaced from said side rails a distance greater than two article diameters;

a longitudinal top row of openings communicating said bottom surface and said top side of said cover above said longitudinal bottom row of openings configured to supply air in the downstream direction at a velocity pressure sufficient to keep the articles in contiguous single file relationship and move them toward said downstream location;

a lower plenum connectable to a source of air under pressure and attached to said underside of said table;

an upper plenum connectable to the source of air under pressure and attached to said cover;

an imperforate side wall along said other edge of said table extending the full length of said circulating zone and said single file zone and having a height at least equal to the distance between said table and said cover; and a laterally extending imperforate barrier positioned between said circulating zone and said single file zone, said barrier having a height at least equal to the distance between said table and said cover, with a first end against said imperforate side wall and a second end spaced from said side rails a distance greater than two article diameters.

7. Apparatus, as claimed in claim 6, wherein:

a first side edge of said cover is offset inwardly from said first side edge of said air table to facilitate discharge of air from said single filer.

8. Apparatus, as claimed in claim 6, wherein:
the lowermost of said side rails is spaced above said upper deck surface to allow air to escape thereunder to hold the single filed articles against said lowermost rail.

9. Apparatus, as claimed in claim 6, wherein:
the velocity pressure of air through said longitudinal top row of openings causes the tops of the articles to tilt in the downstream direction as the articles pass through said circulating zone and said single file zone.

10. Apparatus, as claimed in claim 6, further including:
an adjustable vent in the portion of said imperforate side wall along said circulating zone to control the pressure differential between the higher and lower pressure zones to vary the density of articles at said infeed and the rate of speed at which they are arranged in single file.

11. Apparatus, as claimed in claim 10, wherein said adjustable vent includes:
a lower imperforate panel extending from said infeed to said barrier and having a height substantially less than the distance between said deck and said cover;
an upper imperforate panel having a length substantially the same as said lower panel and having a height slightly greater than the distance between the top of said lower panel and said cover so that said upper and lower panels overlap; and
means releasably and adjustably attaching said upper panel to said lower panel to vary the spacing of said upper panel from said cover.

12. Apparatus, as claimed in claim 11, wherein said attaching means includes:
a row of horizontal openings adjacent opposite ends of one of said panels;
a row of diagonal openings adjacent opposite ends of said other of said panels; and
means extending through said openings in one of said panels into said openings into another of said panels to adjust the height of said second panel relative to said cover to adjust the air pressure within said circulating zone.

13. Apparatus, as claimed in claim 12, wherein said adjusting means includes:
wing nuts with threaded shanks;
one of said panels has tapped openings for threadably receiving said shanks; and
the other of said panels has openings sized to slidably receive said shanks.

14. In a single filer having an air table for transporting upright cylindrical articles from a mass in an upstream article circulating zone where the articles are arranged in single file along a side rail connected to the table to a downstream single file zone where the articles are discharged along said rail in single file by at least a longitudinal row of openings which are parallel to the rail and impart a downstream component of force on the articles when air is discharged therethrough under pressure, the improvement comprising:
an imperforate area in said single file zone adjacent said longitudinal row of opening extending laterally for a distance of more than two article diameters from said side rail;
a plurality of rows of openings extending laterally across said table in said single file zone toward said longitudinal row of openings, said lateral rows imparting a lateral and a downstream component of air velocity when air is discharged therethrough under pressure; and
means for creating a differential lower pressure area upstream from said single file zone to move misaligned articles in said single file zone upstream into said circulating zone.

* * * * *

UNITED STATES PATENT AND TRADEMARK OFFICE
CERTIFICATE OF CORRECTION

PATENT NO. : 5,122,016
DATED     : June 16, 1992
INVENTOR(S) : Ronald A. Lenhart It is certified that error appears in the above-identified patent and that said Letters Patent is hereby corrected as shown below:

Column 1, Line 27, delete "¢" and insert --"--.

Column 9, Line 18, delete "a" (first occurrence).

Column 12, Line 26, delete "opening" and insert --openings--.

Signed and Sealed this

Twenty-fourth Day of August, 1993

Attest:

BRUCE LEHMAN

Attesting Officer        Commissioner of Patents and Trademarks